US010430852B2

(12) United States Patent
Balasubramanian et al.

(10) Patent No.: US 10,430,852 B2
(45) Date of Patent: Oct. 1, 2019

(54) SOCIAL RESULT ABSTRACTION BASED ON NETWORK ANALYSIS

(71) Applicant: International Business Machines Corporation, Armonk, NY (US)

(72) Inventors: Swaminathan Balasubramanian, Troy, MI (US); Mark Bell, Gournay en Bray (FR); Gregory J. Boss, Saginaw, MI (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 14/838,831

(22) Filed: Aug. 28, 2015

(65) Prior Publication Data

US 2017/0061516 A1   Mar. 2, 2017

(51) Int. Cl.
*G06Q 30/06* (2012.01)
*G06Q 50/00* (2012.01)
*G06F 16/93* (2019.01)
*G06F 16/28* (2019.01)
*G06F 16/9535* (2019.01)
*G06F 16/2457* (2019.01)

(52) U.S. Cl.
CPC ... *G06Q 30/0625* (2013.01); *G06F 16/24578* (2019.01); *G06F 16/287* (2019.01); *G06F 16/93* (2019.01); *G06F 16/9535* (2019.01); *G06Q 50/01* (2013.01)

(58) Field of Classification Search
CPC ............................................ G06Q 30/06–30/08
USPC ................................................ 705/26.1–27.2
See application file for complete search history.

(56) References Cited

U.S. PATENT DOCUMENTS

| 8,732,240 | B1 | 5/2014 | Tomkins et al. |
| 2009/0204601 | A1 | 8/2009 | Grasset |
| 2010/0208997 | A1 | 8/2010 | Xie et al. |
| 2010/0287033 | A1* | 11/2010 | Mathur ............. G06F 17/30867 705/319 |
| 2011/0178871 | A1 | 7/2011 | Watfa et al. |
| 2011/0302102 | A1 | 12/2011 | Yeleshwarapu et al. |
| 2011/0320373 | A1 | 12/2011 | Lee et al. |
| 2012/0078884 | A1 | 3/2012 | Callari et al. |

(Continued)

FOREIGN PATENT DOCUMENTS

WO   2013169476 A2   11/2013

OTHER PUBLICATIONS

Yahoo! Wikipedia entry. https://en.wikipedia.org/wiki/Yahoo!, accessed Jul. 10, 2018.*

(Continued)

*Primary Examiner* — Ming Shui
(74) *Attorney, Agent, or Firm* — Edward J. Wixted, III

(57) ABSTRACT

In an approach for aggregating interests across a social network to influence search results by a user, a processor retrieves a set of product documents given a rating by social network connections of a user within a social network. A processor categorizes each product document of the set of product documents such that there is at least a first product category. A processor receives a search request for a product from the user. A processor determines that the product of the search request corresponds to the first product category. A processor presents a search result product based on ratings of product documents of the first product category.

17 Claims, 5 Drawing Sheets

(56) References Cited

U.S. PATENT DOCUMENTS

| | | | |
|---|---|---|---|
| 2012/0278127 A1 | 11/2012 | Krakosyan et al. | |
| 2013/0013622 A1* | 1/2013 | Elliot-McCrea | G06F 17/30038 707/751 |
| 2013/0166540 A1 | 6/2013 | Ganesh et al. | |
| 2013/0262598 A1 | 10/2013 | Makanawala et al. | |
| 2014/0136992 A1* | 5/2014 | Magcale | G06F 17/30 715/753 |
| 2014/0156556 A1 | 6/2014 | Lavian et al. | |
| 2015/0046289 A1 | 2/2015 | Carey et al. | |
| 2015/0127565 A1 | 5/2015 | Chevalier et al. | |
| 2015/0178284 A1* | 6/2015 | Garg | G06F 17/3053 707/748 |

OTHER PUBLICATIONS

Craver, Thom; "Bing Further Bolsters Social Results With 5x More Facebook Content"; Search Engine Watch; Jan. 18, 2013; Printed Mar. 13, 2015; pp. 1-2; <http://searchenginewatch.com/sew/news/2237519/bing-further-bolsters-social-results-with-5x-more-facebook-content#>.

Goodwin, Danny; "Bing Introduces 3-Column Search Results With Snapshots, Social Sidebar"; Search Engine Watch; May 10, 2012; Printed Mar. 13, 2015; pp. 1-2; <http://searchenginewatch.com/sew/news/2173975/bing-introduces-column-search-results-snapshots-social-sidebar>.

Jianxing, Yu; "Hierarchical Organization of Consumer Reviews for Products and Its Applications"; School of Computing National University of Singapore; A Thesis Submitted for the Degree of Doctor of Philosophy; 2012; pp. 1-155.

Mumu, Tamanna, "Social Network Opinion and Posts Mining for Community Preference Discovery"; University of Windsor; Electronic Theses and Dissertations; 2013; Paper 4865; pp. 1-114.

Suresh, et al.; "Using Social data for Personalizing Review Rankings"; Proceedings of the 6th Workshop on Recommender Systems and the Social Web (RSWeb 2014); Oct. 6, 2014; pp. 1-4.

"Google Merges Search and Google+ Into Social Media Juggernaut"; Mashable; Printed Mar. 13, 20215; pp. 1-11; <http://mashable.com/2012/01/10/google-launches-social-search/>.

\* cited by examiner

SOCIAL RESULT ABSTRACTION BASED ON NETWORK ANALYSIS

BACKGROUND OF THE INVENTION

The present invention relates generally to the field of data analysis, and more particularly to aggregating interests across a social network to influence search results by a user.

Analysis of data is a process of inspecting, cleaning, transforming, and modeling data with the goal of discovering useful information, suggesting conclusions and supporting decision making. Data analysis has multiple facets and approaches, encompassing diverse techniques under a variety of names, in different business, science, and social science domains.

Data mining is a particular data analysis technique that focuses on modeling and knowledge discovery for predictive rather than purely descriptive purposes. Business intelligence covers data analysis that relies heavily on aggregation, focusing on business information. In statistical applications, some people divide data analysis into descriptive statistics, exploratory data analysis (EDA), and confirmatory data analysis (CDA). EDA focuses on discovering new features in the data, and CDA focuses on confirming or rejecting existing hypotheses. Predictive analytics focuses on application of statistical models for predictive forecasting or classification, while text analytics applies statistical, linguistic, and structural techniques to extract and classify information from textual sources as species of unstructured data. All are varieties of data analysis.

Social media are computer-mediated tools that allow people to create, share, or exchange information, ideas, and pictures/videos in virtual communities and networks. Furthermore, social media depend on mobile and web-based technologies to create highly interactive platforms through which individuals and communities share, co-create, discuss, and modify user-generated content. Social media introduce substantial and pervasive changes to communication between businesses, organizations, communities, and individuals. Social media is different than traditional or industrial media in many ways, including quality, reach, frequency, usability, immediacy, and permanence. Social media operates in a dialogic transmission system (many sources to many receivers). This is in contrast to traditional media that operates under a monologic transmission model (one source to many receivers).

SUMMARY

Aspects of an embodiment of the present invention disclose a method, computer program product, and computing system for aggregating interests across a social network to influence search results by a user. A processor retrieves a set of product documents given a rating by social network connections of a user within a social network. A processor categorizes each product document of the set of product documents such that there is at least a first product category. A processor receives a search request for a product from the user. A processor determines that the product of the search request corresponds to the first product category. A processor presents a search result product based on ratings of product documents of the first product category.

DETAILED DESCRIPTION

Currently, a user on a social network routinely asks questions, such as, "does anyone have the name of a good plumber?" or "can anyone recommend an auto body shop?" Then, the user waits for the user's friends to respond with recommendations. This provides valuable word-of-mouth referrals for goods and services and allows the user to know that friends think highly of a product or provider.

Embodiments of the present invention recognize the importance of knowing what other people think about a product or service before taking the plunge into purchasing the product or service. Therefore, embodiments of the present invention provide insight to the user by extrapolating from keywords, classifying results, and offering what may be crudely described as an implicit "poll your friends" result. Embodiments of the present invention collect information about the products and services prompted by members of the user's social network, analyze and categorize those products and services, and present aggregated information in a variety of user contexts, including, but not limited to, search and marketing.

Embodiments of the present invention will now be described in detail with reference to the Figures.

Figure 1:
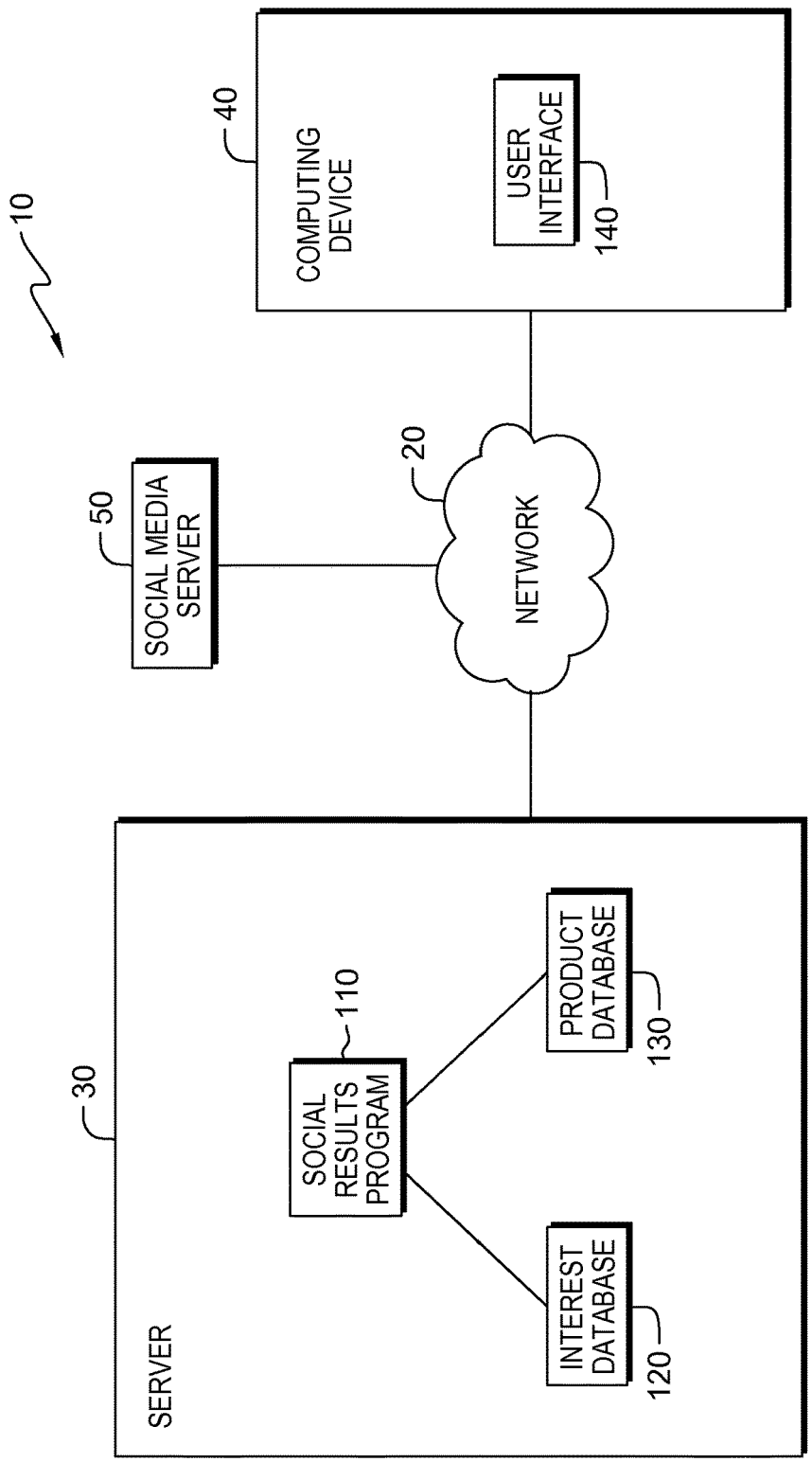
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30, computing device 40, and social media server 50 interconnected over network 20. Network 20 may be a local area network (LAN), a wide area network (WAN) such as the Internet, a cellular data network, any combination thereof, or any combination of connections and protocols that will support communications between server 30, computing device 40, and social media server 50, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 and social media server 50 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains social results program 110, interest database 120, and product database 130. In other embodiments, server 30 may include components, as depicted and described in further detail with respect to FIG. 5.

Computing device 40 may be a desktop computer, laptop computer, netbook computer, or tablet computer. In general, computing device 40 may be any electronic device or computing system capable of processing program instructions, sending and receiving data, and communicating with server 30 and social media server 50 via network 20. In the depicted embodiment, computing device 40 contains user interface 140. In other embodiments, computing device 40 may include components, as depicted and described in further detail with respect to FIG. 5.

Social media server 50 may be a management server, a web server, or any other electronic device or computing system capable of processing program instructions and receiving and sending data. In some embodiments, social media server 50 may be a laptop computer, tablet computer, netbook computer, personal computer (PC), a desktop computer, or any programmable electronic device capable of communicating with server 30 and computing device 40 via network 20. In other embodiments, social media sever 50 may represent a server computing system utilizing multiple computers as a server system, such as in a cloud computing environment. In another embodiment, social media sever 50 represents a computing system utilizing clustered computers and components to act as a single pool of seamless resources. In one embodiment, social media server 50 contains information, such as, for example, expressions of interest from various social media websites. In other embodiments, social media server 50 hosts a social networking website. In some embodiments, social media server 50 is a social media platform. In other embodiments, social media server 50 may include multiple components, as depicted and described in further detail with respect to FIG. 5.

User interface 140 may be any user interface used to access information from server 30, such as information gathered or produced by social results program 110. In some embodiments, user interface 140 may be a generic web browser used to retrieve, present, and negotiate information resources from the Internet. In other embodiments, user interface 140 may be a software program or application that enables a user at computing device 40 to access server 30 over network 20. In the depicted embodiment, user interface 140 resides on computing device 40. In other embodiments, user interface 140, or similar user interfaces, may reside on another computing device, another server, or server 30, provided that user interface 140 is accessible to social results program 110.

Social results program 110 aggregates interests across a social network to influence search results by a user. In one embodiment, the search results are within a search engine. In other embodiments, the search results are within a social network. In doing so, social results program 110 collects expressions of interest by friends of a user. Social results program 110 analyzes the expressions of interest. Social results program 110 receives a search request for a product or service from a user. Social results program 110 determines whether the requested product or service matches a product type. Social results program 110 locates expressions of interest by friends of the user within the determined product type. Social results program 110 presents products within the located expressions of interest to the user. In the depicted embodiment, social results program 110 resides on server 30. In other embodiments, social results program 110 may reside on another server, computing device, or computing device 40, provided that social results program 110 can access interest database 120, product database 130, and user interface 140 via network 20.

Interest database 120 may be a repository that may be written to or read by social results program 110. In one embodiment, a program (not shown) may allow a user to define various user interests to analyze and store to interest database 120. In some embodiments, interest database 120 may store user interests that are defined within a user's social media profile. In other embodiments, interest database 120 may store user interests that were previously analyzed and placed into a certain category. In the depicted embodiment, interest database 120 resides on server 30. In other embodiments, interest database 120 may reside on another server, computing device, or computing device 40, provided that interest database 120 is accessible to social results program 110 via network 20.

Product database 130 may be a repository that may be written to or read by social results program 110. In some embodiments, a program (not shown) may allow a user to define various product categories and product types to analyze and store to product database 130. In other embodiments, product database 130 may store product categories and product types that are provided, for example, based on a development of the United Nations (UN) Central Product Classification. In the depicted embodiment, product database 130 resides on server 30. In other embodiments, product database 130 may reside on another server, computing device, or computing device 40, provided that product database 130 is accessible to social results program 110 via network 20.

As used herein, the term "product" may refer to a product or a service.

Figure 2:
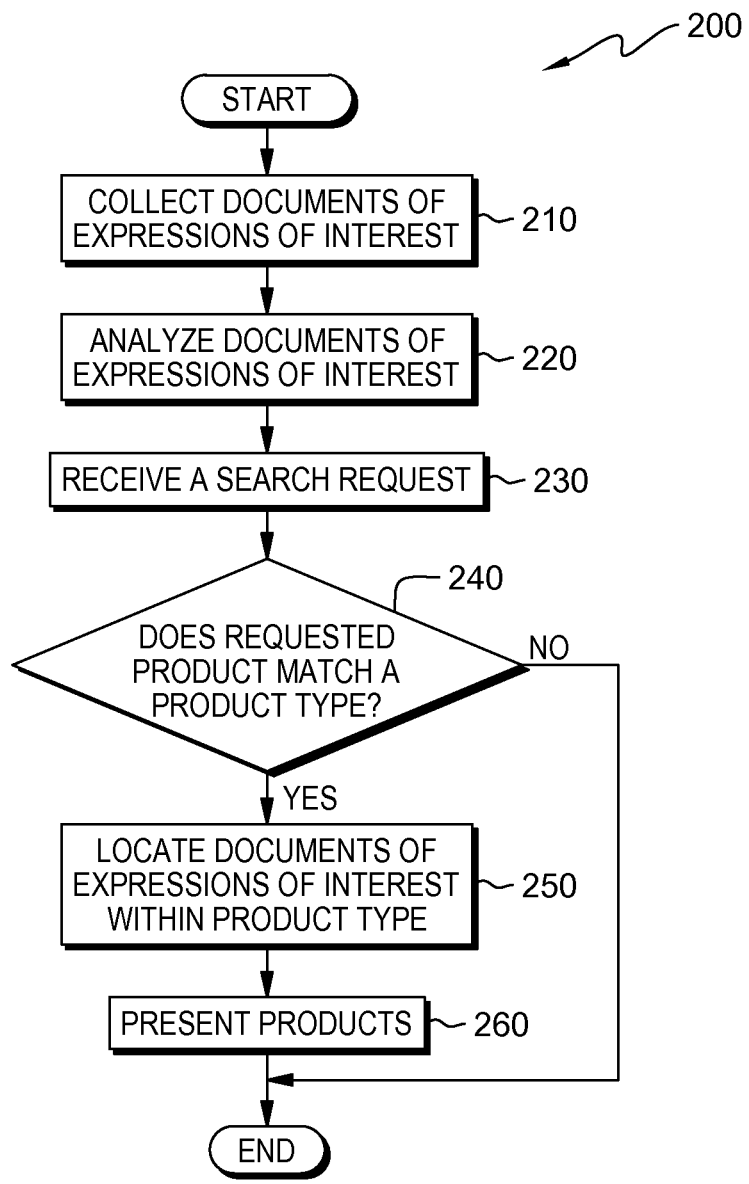
FIG. 2 depicts a flowchart of the steps of a social results program, executing within the computing system of FIG. 1, for aggregating interests across a social network to influence search results by a user, in accordance with an embodiment of the present invention.

In FIG. 2, environment 200 depicts a flowchart of the steps of a social results program, executing within the computing system of FIG. 1, in accordance with an embodiment of the present invention. Social results program 110 aggregates interests across a social network to influence search results by a user.

In step 210, social results program 110 collects expressions of interest by social network connections (e.g., friends, connections, or contacts) of a user. Expressions of interest may include "likes" (i.e., a feature in communication software where a user can express that they like, enjoy, or support certain content), although other similar expressions are equally interchangeable. A like would be considered a favorable rating. On the other hand, expressions of interest may include "dislikes," taking into consideration something that social network connections of the user dislikes. A dislike would be considered an unfavorable rating. In the case of a dislike, social results program 110 would not present to the user the results of things that are disliked. In one embodiment, social results program 110 collects expressions of interest by friends of a user through user interface 140. In other embodiments, social results program 110 accesses or monitors social media networks, such as a social network hosted by social media server 50, and collects expressions of interest by friends of a user by retrieving the expressions of interest from social media server 50.

Raw information about the expressions of interest of each of a set of users is aggregated and collected in a location for processing, such as interest database 120 or product database 130. The location for processing or the location where the original expressions of interest may be any of several possibilities, including, but not limited to, within the search provider's local or cloud storage; within the social network provider's local or cloud storage; within a third party aggregator's local or cloud storage; and on a given user's local or cloud storage. In some embodiments, the expressions of interest are associated with a person in the user's social network.

In step 220, social results program 110 analyzes the expressions of interest. In one embodiment, social results program 110 ascribes a category to each "liked" object. For example, if a like is listed in textual form for an object, such as "pool," then this object may be assigned to a category, such as "swimming," or "billiards."

These categories can be assigned to objects in any of several ways. In one embodiment, social results program 110 categorizes objects by performing generalized searches on the object and inferring a category. In some embodiments, social results program 110 categorizes objects by performing analysis against a website to infer a category. In other embodiments, social results program 110 categorizes objects through look-up of business services or other canonical lists, or it can occur through known textual analysis techniques, including latent semantic analysis methods (LSA), such as term frequency-inverse document frequency (TF-IDF) or others. LSA is a technique in natural language processing of analyzing relationships between a set of documents and the terms they contain by producing a set of concepts related to the documents and terms. TF-IDF is a numerical statistic that is intended to reflect how important a word is to a document in a collection or corpus. Still, in some embodiments, social results program 110 categorizes objects through the use of a centralized service provided by a search provider, social network provider, or another third party system. This categorization, as applied to a user's social network, can be stored in any of several places, including, but not limited to, at the search provider, social network provider, third party system, or user's local or cloud storage.

In one embodiment, categorization, is applied such that a term is assigned to only one category. In other embodiments, categorization is applied such that a term may be assigned to multiple categories. These assignments may be synonymous or near-synonymous categories, e.g., "restaurants" and "Mexican food." Additionally, these assignments may be relevance dependent upon context, e.g., JAM could refer to "Just Another Meaning" or to "Jumping Above Mankind." In these cases, categorization can be chosen through a most common usage, according to user location, or other decision criteria.

In step 230, social results program 110 receives a search request for a product or service from a user. The user may be searching in any realm of the Internet, for example, a search engine. In one embodiment, social results program 110 receives a search request via user interface 140. In other embodiments, social results program 110 receives a search request via a service provider. In some embodiments, social results program 110 receives a search request via a social network provider. Still, in other embodiments, social results program 110 receives a search request via a third party system.

In decision 240, social results program 110 determines whether the requested product or service matches a product or service type within a database, such as product database 130. In some embodiments (not shown), social results program 110 determines whether the requested product or service matches, within a predetermined threshold, a product or service type within product database 130. Social results program 110 makes the determination by comparing the requested product to the product or service types within product database 130. If social results program 110 determines that the requested product or service does not match (decision 240, no branch), social results program 110 ends. In some embodiments (not shown), social results program 110 stores requested products or services that do not match to product database 130 for further analysis. If social results program 110 determines that the requested product or service does match (decision 240, yes branch), social results program 110 locates expressions of interest by friends of the user within the determined product type (step 250).

In step 250, social results program 110 locates expressions of interest by friends of the user within the determined product type. In one embodiment, social results program 110 locates these expressions of interest via social media server 50 from a user's input in user interface 140. In other embodiments, social results program 110 locates these expressions of interest via interest database 120. In some embodiments, social results program 110 locates these expressions of interest via a service provider, social network provider, or third party system.

In step 260, social results program 110 presents products that are seen within the located expressions of interest to the user. In one embodiment, social results program 110 presents to the user abstracted social results in response to standard web queries. For example, if a searching user looks for "new car," then social results program 110 may show that 11% of the user's friends are interested in (or like) Car A, 6% like Car B, and 5% like Car C. The user, intrigued by the fact that so many of the user's friends are interested in Car A, may be influenced in researching new cars or decisions in buying new cars. In some embodiments, social results program 110 presents to the user advertisements for relevant products or services as a result of social network interests. For example, if a searching user looks for "new car," the user may see advertisements for Car A, Car B, or Car C. Given these are the most common likes within the user's social network, a strong demographic match may be assumed, and thus, these results may be of greatest value for the advertiser. In other embodiments, social network program 110 presents to the user abstracted social results that are fed into analytics services or contextual engines. For example, results may be used by analytics engines, attempting to provide the "right information at the right time." An example usage might be in the equivalent of a card offered by an analytics engine service. In this case, the user may be preemptively prompted, e.g., "You have been searching on cars; have you considered Car A?" Still, in some embodiments, social results program 110 presents to the user social results in response to detection of user location. For example, location based services may be used to present social results, optionally in conjunction with analytics services. If the user travels to Norfolk, Va., the user may be prompted to try Restaurant D and Restaurant E, two restaurants located in Norfolk, Virginia that are most liked by the user's social network.

An example of an embodiment of the present invention is as follows: (1) A user's social network is searched for likes. A given friend may have likes, such as the following, which are then collected: Willard Elementary School; Car A; Hometown Pizzeria; Restaurant D; and Hometown Vineyards. This step is repeated for the participants in a user's social network, or some subset thereof, e.g., for specialized groups, such as "personal friends." (2) The friends' likes are analyzed and categorized into one or more categories. This categorization may involve application of generalized categorical keywords, as applied to the specific examples in the list, e.g., Willard Elementary School: School, Educational Institution; Car A: Automobile Manufacturer, Cars; Hometown Pizzeria: Restaurant, Italian Food; Restaurant D: Restaurant, Seafood, Norfolk Restaurant; and Hometown Vineyards: Vineyards, Wine. Such categorizations are made for person's likes in the user's social network, and may be periodically refreshed to ensure accuracy. (3) The user is presented with social search results, as highlighted above, e.g., the user may perform a search on cars and realize that a plurality of the user's friends are interested in Car A, with which the user is unfamiliar. Based on this unexpected social search result, the user may decide to research Car A further. Intrigued by the product, but deciding that the brand is out of the user's price range, the user is then prompted with the information that Car B is also extraordinarily high on the user's social network's interests. The user researches Car B and decides that this option is better suited to the user's budget. Despite no previous knowledge of these types of cars, in this case, the user's opinion is fundamentally shaped by the social search results.

Figure 3:
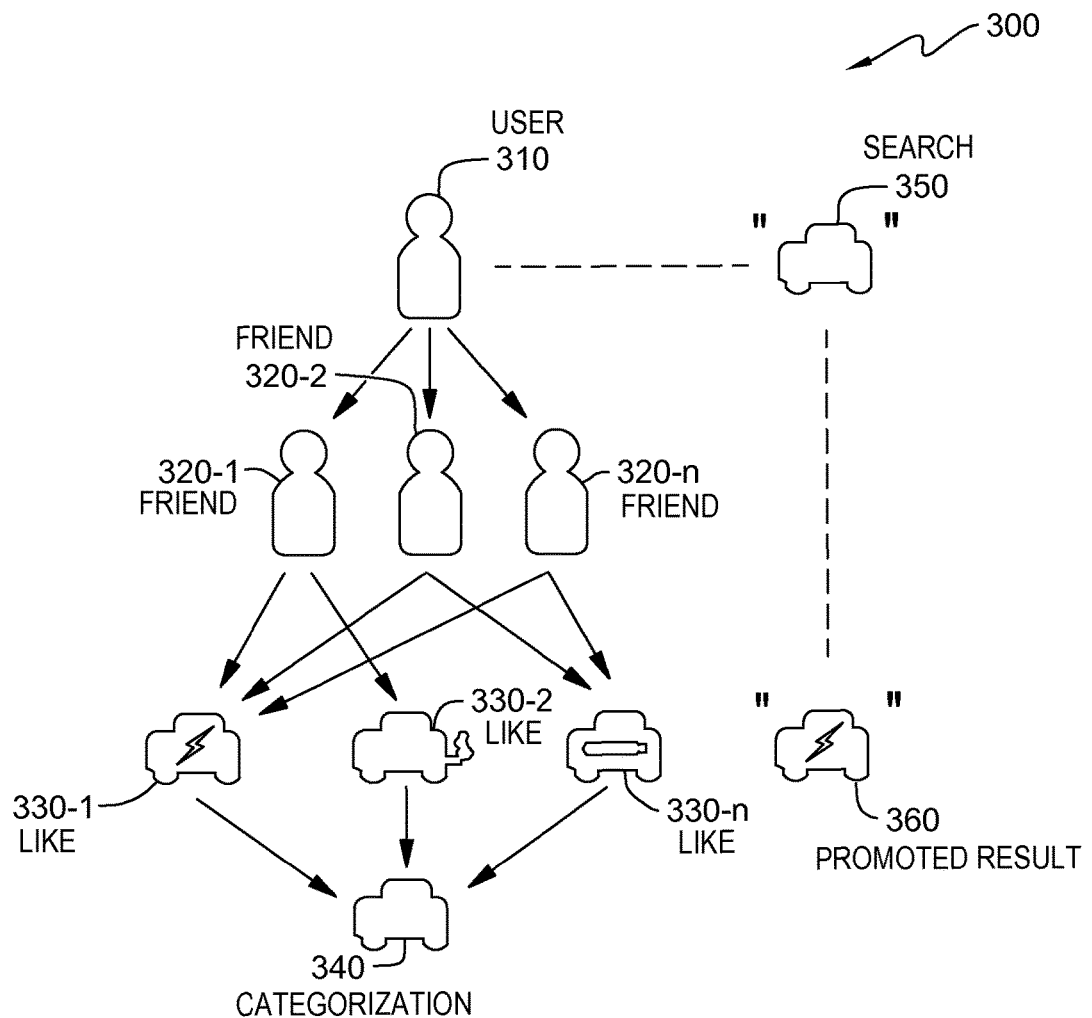
FIG. 3 depicts an example describing the circumstances that may lead to a user receiving a result based on a search, in accordance with an embodiment of the present invention.

In FIG. 3, environment 300 depicts an example describing the circumstances that may lead to a user receiving a result based on a search. User 310 is a member of a social network that includes friend 320-1, friend 320-2, and friend 320-n, where friend 320-1 through 320-n represents any number of friends of user 510. Friends 320-1 through 320-n show expressions of interest in the form of "likes." Like 330-1 was expressed by friend 320-1, friend 320-2, and friend 320-n. Like 330-2 was expressed by only friend 320-1. Like 330-n was expressed by friend 320-2 and friend 320-n Like 330-1 through 330-n represents any number of expressions of interest made by friend 320-1 through 320-n. Social results program 110 uses these expressions of interest to categorize and assign a product type to the expressions of interest, as described in FIG. 2. Categorization 340 is the product type assigned to like 330-1 through 330-n. In the depicted embodiment, the category is cars, and the likes refer to an electric car, a gasoline car, and a hydrogen fuel cell car.

Search 350 is a query of a product searched for by user 510. Social results program 110 matches search 350 to a predetermined product type. From the matched product type, social results program 110 locates the expressions of interest made by friend 320-1 through 320-n in the forms of like 330-1 through 330-n and presents promoted result 360 to user 510. Promoted result 360 is the product within like 330-1 and is chosen because like 330-1 received the most expressions of interest by friend 320-1 through 320-n.

It will be appreciated that in some embodiments, a number of products may be promoted by this approach. In this such an embodiment, a ranking system may be used to determine which of the prompted products should be given the greatest prominence. In one embodiment, there is a predetermined threshold value to indicate the number of "likes" that it will take to allow the product to be a promoted result. In other embodiments, the proximity of the searching user's relationship with the friends, the age of the "like," etc. may be used to determine which of the prompted products should be given the greatest prominence. In some embodiments, further natural language processing techniques may be employed to determine prominence, e.g., social results program 110 may recognize that the suggestions for a service provider located in a distant city are not relevant to the searching user, based on such textual analysis.

It will further be appreciated that in some embodiments, the categorization may take place at different levels of generalization. In one embodiment, if a user searches for a product category, social results program 110 may respond with product types, rather than specific products. For example, when a user searches for "new car," rather than presenting a list of different cars "liked" by the user's friends, social results program 110 may use an intermediate categorization of "electric cars," based on the fact that the user's friends' "likes" relate mostly to different vehicles in the electric vehicle sub-category.

Figure 4:
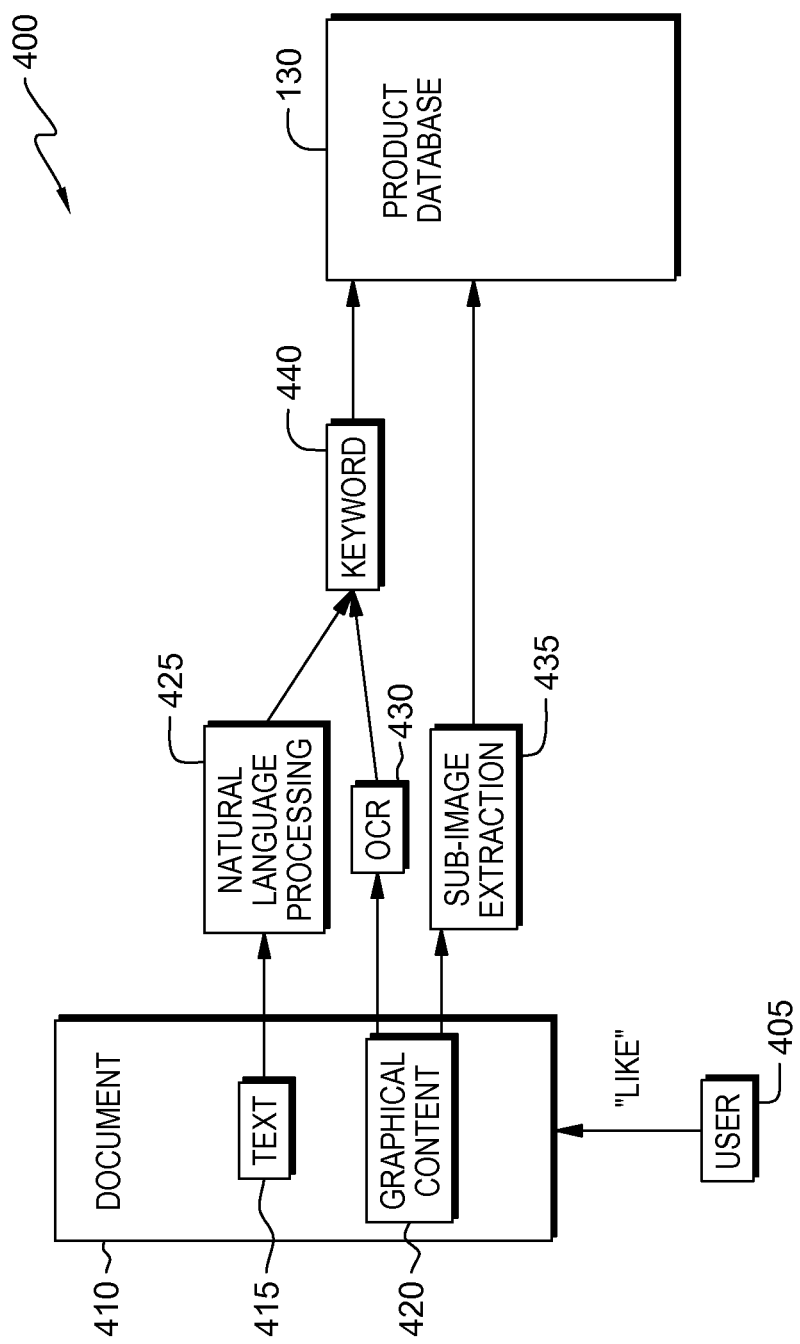
FIG. 4 depicts the categorization of the expressions of interest in the form of "likes" by users, in accordance with an embodiment of the present invention.

In FIG. 4, environment 400 depicts the categorization of the expressions of interest in the form of "likes" by users. User 405 expresses a "like" for a document 410. Social results program 110 may retrieve document 410 from interest database 120. Depending on the document type, one or more processing approaches may then be applied to extract the relevant meaning of the document. Where document 410 contains machine readable text 415, this may immediately be parsed to identify keywords 440. It may also be appropriate to apply more sophisticated natural language processing 425 techniques, known or unknown by one of ordinary skill, to determine context and implied content. Where document 410 contains graphical content 420, this may be converted to machine readable text by conventional optical character recognition (OCR) 430 techniques before processing in the same way as text 415.

Meanwhile, there is a product database provided, such as product database 130, for example, based on a development of the United Nations (UN) Central Product Classification. This database associates each product type with two sets of keywords, namely synonyms and trademarks. Synonyms are alternative words for a particular product type, including words in foreign languages. Trademarks are terms used by manufacturers to identify the source of goods, and often used for specific products to distinguish them from similar products of competitors. This database also populated with examples of each product type defined in the database.

In accordance with the present invention, keywords 440 extracted from the document 410 may be used to search against the product database. When a keyword 440 is found to correspond to a product (either matching the product type itself or an associated synonym or trademark), the document 410 is classified as corresponding to that category. This classification is associated with the user 405 "liking" the document 410.

Graphical content 420 will also be processed to identify discrete objects reflected in the document 410 using object recognition processes. Where the document 410 contains graphical content 420, sub-objects within the graphical content 420 are detected using sub-image extraction 435 with reference to the examples in the product database, or otherwise. Where it is found that the graphical content 420 incorporates a sub-object corresponding to a particular product image, the document 410 is classified as corresponding to the product type associated with that category. Furthermore, this classification is associated with the user 405 "liking" the document 410.

Figure 5:
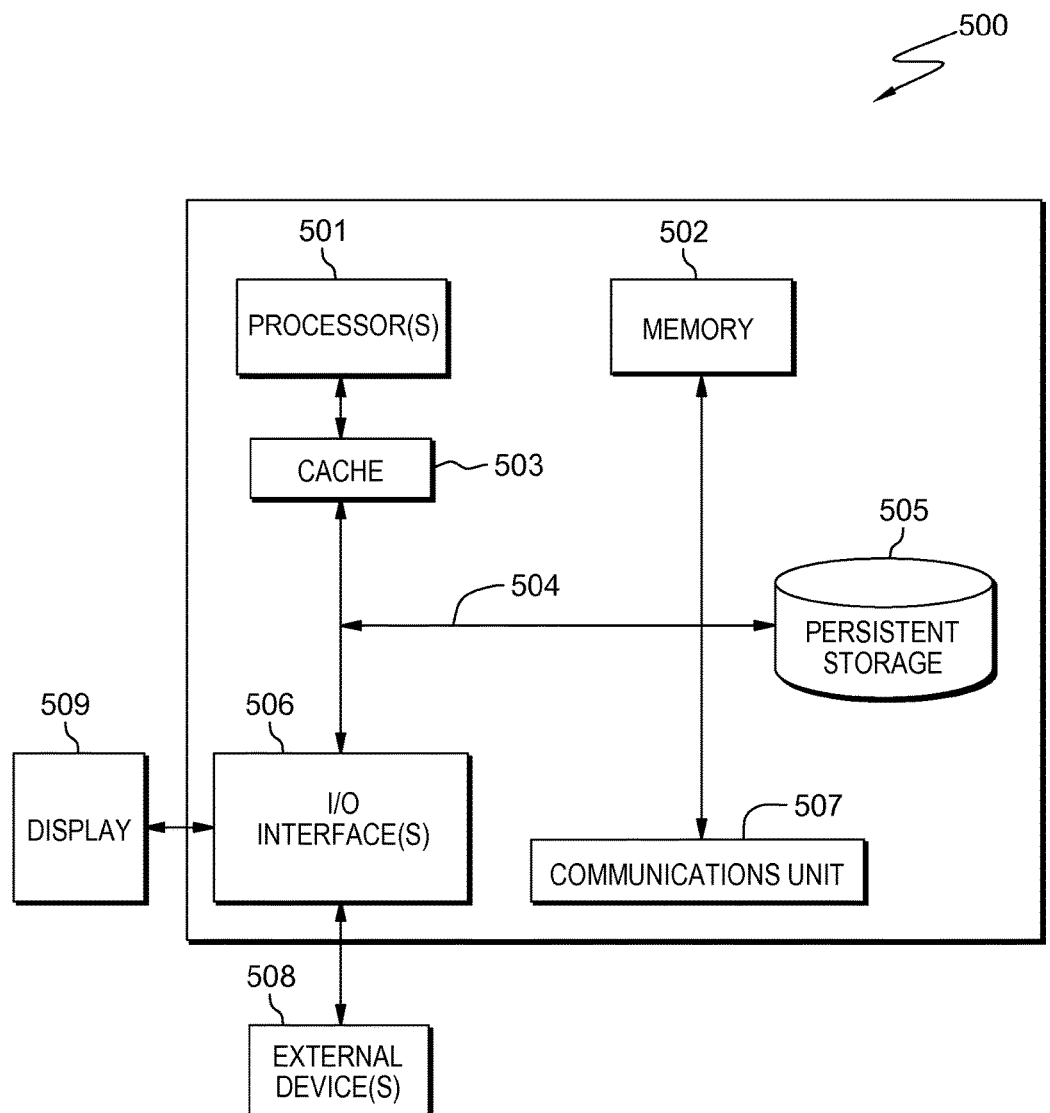
FIG. 5 depicts a block diagram of components of the server and/or the computing device of FIG. 1, in accordance with an embodiment of the present invention.

In FIG. 5, environment 500 depicts computer system 500, which is an example of a system that includes components of server 30 and/or computing device 40. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507. Social results program 110 and interest database 120 may be downloaded to persistent storage 505 of server 30 through communications unit 507 of server 30. User interface 140 may be downloaded to persistent storage 505 of computing device 40 through communications unit 507 of computing device 40.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., social results program 110 and interest database 120, can be stored on such portable computer readable storage media and can be loaded onto persistent storage 505 of server 30 via I/O interface(s) 506 of server 30. Software and data used to practice embodiments of the present invention, e.g., user interface 140, can be stored on such portable computer readable storage media and can be loaded onto persistent storage 505 of computing device 40 via I/O interface(s) 506 of computing device 40. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for aggregating interests across a social network to influence search results by a user, the method comprising:
   retrieving, by one or more processors, a set of product documents given a rating by social network connections of a user within a social network;
   categorizing, by one or more processors, each product document of the set of product documents such that there is at least a first product category;
   receiving, by one or more processors, a search request for a product from the user;
   determining, by one or more processors, that the product of the search request corresponds to the first product category; and
   presenting, by one or more processors, a search result product based on ratings of product documents and the first product category, wherein presenting the search result product based on the ratings of the product documents and the first product category comprises:
      presenting a product of the first product category corresponding to a different product than the product document of the first product category based on unfavorable ratings of the product document.

2. The method of claim 1, wherein presenting the search result product based on the ratings of the product documents of the first product category comprises presenting a product corresponding to a product document of the first product category based on favorable ratings of the product document.

3. The method of claim 1, further comprising:
   providing, by one or more processors, a database, wherein the database includes product categories associated with trademarks and synonyms of the product categories.

4. The method of claim 3, wherein categorizing each product document of the set of product documents comprises:
   extracting, by one or more processors, an object from each product document; and
   identifying, by one or more processors, a product category of the database corresponding to each extracted object.

5. The method of claim 4, wherein each extracted object is selected from the group consisting of textual content and graphical content.

6. The method of claim 1, wherein the product is a service.

7. A computer program product for aggregating interests across a social network to influence search results by a user, the computer program product comprising:
   one or more computer readable storage media and program instructions stored on the one or more computer readable storage media, the program instructions comprising:

program instructions to retrieve a set of product documents given a rating by social network connections of a user within a social network;

program instructions to categorize each product document of the set of product documents such that there is at least a first product category;

program instructions to receive a search request for a product from the user;

program instructions to determine that the product of the search request corresponds to the first product category; and program instructions to present a search result product based on ratings of product documents and the first product category, wherein program instructions to present the search result product based on the ratings of the product documents and the first product category comprise:

program instructions to present a product of the first product category corresponding to a different product than the product document of the first product category based on unfavorable ratings of the product document.

8. The computer program product of claim 7, wherein program instructions to present the search result product based on the ratings of the product documents of the first product category comprise program instructions to present a product corresponding to a product document of the first product category based on favorable ratings of the product document.

9. The computer program product of claim 7, further comprising:

program instructions, stored on the one or more computer readable storage media, to provide a database, wherein the database includes product categories associated with trademarks and synonyms of the product categories.

10. The computer program product of claim 9, wherein program instructions to categorize each product document of the set of product documents comprise:

program instructions to extract an object from each product document; and program instructions to identify a product category of the database corresponding to each extracted object.

11. The computer program product of claim 10, wherein each extracted object is selected from the group consisting of textual content and graphical content.

12. The computer program product of claim 7, wherein the product is a service.

13. A computer system for aggregating interests across a social network to influence search results by a user, the computer system comprising:

one or more computer processors, one or more computer readable storage media, and program instructions stored on the computer readable storage media for execution by at least one of the one or more processors, the program instructions comprising:

program instructions to retrieve a set of product documents given a rating by social network connections of a user within a social network;

program instructions to categorize each product document of the set of product documents such that there is at least a first product category;

program instructions to receive a search request for a product from the user;

program instructions to determine that the product of the search request corresponds to the first product category; and program instructions to present a search result product based on ratings of product documents and the first product category, wherein program instructions to present the search result product based on the ratings of the product documents and the first product category comprise:

program instructions to present a product of the first product category corresponding to a different product than the product document of the first product category based on unfavorable ratings of the product document.

14. The computer system of claim 13, wherein program instructions to present the search result product based on the ratings of the product documents of the first product category comprise program instructions to present a product corresponding to a product document of the first product category based on favorable ratings of the product document.

15. The computer system of claim 13, further comprising:

program instructions, stored on the computer readable storage media for execution by at least one of the one or more processors, to provide a database, wherein the database includes product categories associated with trademarks and synonyms of the product categories.

16. The computer system of claim 15, wherein program instructions to categorize each product document of the set of product documents comprise:

program instructions to extract an object from each product document; and program instructions to identify a product category of the database corresponding to each extracted object.

17. The computer system of claim 16, wherein each extracted object is selected from the group consisting of textual content and graphical content.

* * * * *